(12) United States Patent
Franke et al.

(10) Patent No.: US 11,175,567 B2
(45) Date of Patent: Nov. 16, 2021

(54) OBJECTIVE LENS MAIN BODY, OBJECTIVE LENS, AND OBJECTIVE LENS SYSTEM

(71) Applicant: Carl Zeiss AG, Oberkochen (DE)

(72) Inventors: Jochen Franke, Heubach-Lautern (DE); Joachim Welker, Heidenheim (DE)

(73) Assignee: Carl Zeiss AG, Oberkochen (DE)

( * ) Notice: Subject to any disclaimer, the term of this patent is extended or adjusted under 35 U.S.C. 154(b) by 294 days.

(21) Appl. No.: 16/517,597

(22) Filed: Jul. 21, 2019

(65) Prior Publication Data

US 2020/0026159 A1    Jan. 23, 2020

(30) Foreign Application Priority Data

Jul. 20, 2018    (DE) ..................... 10 2018 212 116.8

(51) Int. Cl.
   *G03B 17/14*    (2021.01)
   *G02B 7/04*    (2021.01)
   (Continued)

(52) U.S. Cl.
   CPC ............... *G03B 17/14* (2013.01); *G02B 7/04* (2013.01); *H04N 5/2254* (2013.01); *H04N 5/23203* (2013.01)

(58) Field of Classification Search
   None
   See application file for complete search history.

(56) References Cited

U.S. PATENT DOCUMENTS

| 8,814,448 B2 | 8/2014 | Otani et al. |
| 9,442,270 B2 | 9/2016 | Araki et al. |

(Continued)

FOREIGN PATENT DOCUMENTS

| DE | 102006019449 A1 | 10/2007 |
| DE | 102015110177 A1 | 12/2016 |

(Continued)

OTHER PUBLICATIONS

Office Action issued in Chinese counterpart application No. 201910623226.X dated Jan. 6, 2021 and English-language translation thereof.

(Continued)

*Primary Examiner* — William B Perkey
(74) *Attorney, Agent, or Firm* — Falk Ewers; Ewers IP Law PLLC

(57) ABSTRACT

An objective lens main body and an objective lens system formed by the objective lens are provided. The objective lens main body includes a main frame for retaining optical functional elements and at least one adjustable, optical functional element that is retained adjustably thereon. The objective lens main body furthermore includes at least one adjustment drive arranged on the main frame for adjusting the adjustable functional element or at least one of the adjustable functional elements. In addition, the objective lens main body includes an electronics board attached indirectly or directly to the main frame that has at least one plug-in location for reversibly receiving a plug-in card, and a first controller that is configured as a plug-in card and inserted into the plug-in location or one of the plug-in locations and is set up for exchanging signals with an electrical module of the objective lens or an external unit.

18 Claims, 5 Drawing Sheets

(51) Int. Cl.
*H04N 5/225* (2006.01)
*H04N 5/232* (2006.01)

(56) References Cited

U.S. PATENT DOCUMENTS

| | | |
|---|---|---|
| 2009/0059401 A1 | 3/2009 | Yamazaki |
| 2011/0019367 A1* | 1/2011 | Hatch .............. G06K 19/07739 |
| | | 361/737 |
| 2014/0140687 A1 | 5/2014 | Otani et al. |
| 2017/0163858 A1 | 6/2017 | Shiraishi |

FOREIGN PATENT DOCUMENTS

| | | |
|---|---|---|
| GN | 1485671 A | 3/2004 |
| JP | 2003172863 A | 6/2003 |
| WO | 2013018453 A1 | 2/2013 |

OTHER PUBLICATIONS

Office Action of the German Patent and Trademark Office dated Feb. 12, 2020 (Priority Application No. DE 10 2018 212 116.8) and English-language translation thereof.
Office Action issued in Japanese Patent Application No. JP 2019-112177 (from which this application claims priority), dated Oct. 13, 2020 and English language machine translation thereof.
Office Action of the German Patent and Trademark Office dated Apr. 24, 2019 (Priority Application No. DE 10 2018 212 116.8) and English-language translation thereof.
U.S. Appl. No. 16/517,596, filed Jul. 20, 2019, Jochen Franke et al.

\* cited by examiner

OBJECTIVE LENS MAIN BODY, OBJECTIVE LENS, AND OBJECTIVE LENS SYSTEM

CROSS REFERENCE TO RELATED APPLICATIONS

This application claims priority to German patent application DE 10 2018 212 116.8, filed Jul. 20, 2018, the entire content of which is incorporated herein by reference.

TECHNICAL FIELD

The disclosure relates to an objective lens main body and to an objective lens including the objective main body for a camera for recording still images and/or moving images. The disclosure furthermore relates to an objective lens system having an objective lens including the objective lens main body.

BACKGROUND

An objective lens is generally understood to mean a set (i.e., a group) of optical lens elements which are arranged successively along an optical axis (i.e., along a direction of propagation of an incident light ray) to image an object onto an image plane, typically formed by an optically sensitive surface. The optically sensitive surface in modern cameras is typically a "detector chip", for example a charge-coupled device (CCD) sensor, a complementary metal-oxide-semiconductor (CMOS) sensor, or the like. In order to permit sharp imaging of the object onto the optically sensitive surface, even when the distance to the objective lens varies, at least one of the lenses is typically mounted so that it can be moved along the optical axis for so-called focusing (also referred to as the "focus lens"). Sometimes, at least one further lens is provided which can be moved along the optical axis, and which can be used to change the focal length of the entire objective lens (also referred to as "zoom lens"). Objective lenses furthermore typically also include a diaphragm (e.g., an iris diaphragm) by which the diameter of the diaphragm opening (also referred to as the aperture), i.e., the beam path through the objective lens, can be changed so as to be able to regulate the amount of light that is incident on the image plane.

In objective lenses having a zoom function, the corresponding lens (zoom and/or focus lens) is frequently adjustable manually by a correspondingly associated rotating ring arranged on an objective lens exterior housing (said ring also being referred to as "hand wheel"). Such a rotating ring typically converts a rotary motion into a longitudinal motion of the respective lens by a sliding block guide or cam guide. Likewise, such a rotating ring is also sometimes used to permit manual adjustment of the diaphragm opening (for example the iris diaphragm).

In modern objective lenses, however, at least one of the above-described movable components (for example the focus lens, the zoom lens and/or the diaphragm) or a combination of said components is frequently adjustable by an electric motor.

Optionally, mechanical coupling between the rotating rings and the components that are to be adjusted can also be dispensed with in modern objective lenses. In this case, for example, the rotary position of the respective rotating ring is read by a rotary position sensor and is transferred to the electromotive drive of the respective lenses in the form of an electrical input signal.

Some objective lenses also include an indication apparatus (typically a display), arranged on the external housing, do display the current objective lens settings (for example the focal length, the diaphragm position, and the like).

Some modern objective lenses are also set up to automatically infer from a respective lens position an imaging error (for example vignetting, aberrations, and distortions) resulting from a current objective lens setting and to output said information to the camera and/or to an image processing computer via an interface.

It has been recognized that electronic control devices (also referred to as controllers below), for example microprocessors and/or application-specific integrated circuits (ASICS), an energy supply, and corresponding signal interfaces to the camera carrying the respective objective lens and/or to an image processing computer, are required for the above-described functions.

SUMMARY

It is an object of the disclosure to provide an improved objective lens.

This object is achieved by an objective lens main body, an objective lens, and an objective lens system as disclosed herein.

The objective lens main body according to an aspect of the disclosure is typically set up and provided in the form of a part of an objective lens for use with a camera. In particular, such an objective lens is an interchangeable objective lens for said camera. The objective lens main body includes according to an aspect of the disclosure a main frame for retaining optical functional elements. The objective lens main body furthermore includes at least one adjustable, optical functional element that is retained adjustably on the main frame. In addition, the objective lens main body also includes at least one typically electric adjustment drive, arranged on the main frame, for adjusting the adjustable functional element or at least one of the adjustable functional elements. In the case of a plurality of optical functional elements that are in particular adjustable independently from one another, the objective lens main body typically at least also includes in each case an associated adjustment drive. The objective lens main body furthermore includes an electronics board that is attached indirectly or directly to the main frame, said electronics board including at least one plug-in location for reversibly receiving an (in particular electronic) plug-in card. In addition, the objective lens main body includes a first controller that is configured as such a plug-in card and is inserted into the plug-in location or one of the plug-in locations. Said controller is set up for exchanging signals, that is to say for receiving and/or transmitting electrical signals, with an electrical module of the objective lens (in particular formed by way of the objective lens main body) or an external unit (in particular with respect to said objective lens).

The objective lens main body typically also includes a plurality of (i.e., at least two) lenses, at least one of which is adjustable (typically along an optical axis, and additionally or alternatively also optionally transversely to said axis). These lenses are retained (possibly adjustably) on the main frame. The objective lens main body also includes an adjustable diaphragm that is arranged on the main frame and typically serves for changing the size of a diaphragm opening, that is to say an aperture of the objective lens.

The above-described controller, specifically the plug-in card forming it, is typically embodied in the form of a dedicated electronics module. In particular, said electronics module serves for controlling and/or signal transmission to or from a specific electrical module of the objective lens itself or also of an external device (also: external unit or "peripheral device"). The respective controller typically makes available a specific objective lens function. The respective controller also optionally embodies an electrical module of the objective lens itself. The plug-in card forming the controller (also referred to as "insertion assembly") optionally has an approximately one-dimensional shape (that is to say in particular elongate with a comparatively small diameter, for example a type of needle), an approximately two-dimensional shape (for example in the manner of a "typical" card, in particular a fixed, curved or flexible printed circuit board) or a three-dimensional shape (for example in the manner of a pyramid, in the manner of a cube or in the manner of a cylinder).

Due to the fact that the above-described first controller in the form of a plug-in card can be reversibly connected to the electronics board, a modularity of the objective lens is made possible. In addition it becomes possible in a particularly simple manner, if the first controller experiences a malfunction, for only this first controller to be exchanged separately, rather than having to exchange the entire electronics system of the objective lens. It is furthermore also possible in the case of an improvement (in particular refinement) of the first controller for the entire objective lens to be adapted to the new level of development in a simple manner by way of an exchange of only the first controller.

The adjustment drive in one exemplary embodiment is embodied as a purely manually actuable drive ("mechanism"), that is to say a drive that is actuable by way of mechanical means of power transmission (for example gears or other transmission types, sliding block guides or the like). Alternatively, the adjustment drive is formed by an electrical, magnetic or hybrid (for example piezoelectric or electromagnetic) drive. In particular, the adjustment drive is embodied in the form of a stepper motor, arc drive, microdrive, ultrasonic drive (for example ring ultrasonic drive), micro ultrasonic drive, sonic, hypersonic, supersonic drive or any desired combination of said drives.

In an exemplary embodiment, the above-described first controller is set up for controlling the adjustment drive or one of the possible plurality of adjustment drives (representing in each case one of the above-described electrical modules). The specific objective lens function controlled by the controller (and provided by the respective adjustment drive) is thus in this case the adjustment of the respective functional element. The respective adjustment drive consequently represents an electrical module of the above-described type.

The objective lens according to an aspect of the disclosure includes the objective lens main body, which has already been described and will be described in more detail below, and an external housing for enclosing said objective lens main body. That means that in the mounted state of the objective lens in accordance with the intended use, the outer housing surrounds the respective optical functional element, the (possibly the respective associated) adjustment drive, the main frame, the electronics board, and the controller arranged thereon (that is to say the corresponding plug-in card), and possibly also the lenses and the diaphragm. The main frame here has an attachment apparatus, also referred to as a mechanical interface, for the outer housing, said attachment apparatus serving in particular for reversibly receiving and retaining the outer housing on the main frame. The outer housing is expediently embodied such that the beam path along the optical axis remains free through the lenses. Since the objective lens main body in accordance with the intended use forms part of the objective lens, the latter consequently has the same features and thus the same advantages as the objective lens main body.

In an exemplary embodiment, the electronics board forms an electrical connection for transmitting energy and/or data (that is to say in particular control signals) between the (in particular the respective) controller and the associated electrical module (for example the electrical module that is to be controlled by said controller)—for example sensors or the like associated with the respective adjustment drive and/or with the objective lens or with the camera. In an exemplary embodiment, the electronics board in particular represents "merely" a data and/or energy bus. In this case, the electronics board therefore carries in particular no additional control components for controlling objective lens functions in addition to the connection lines, the possible plurality of plug-in locations and the connection locations to the respective module (that is to say for example the lens drive or the diaphragm drive). The electronics board optionally includes only electronic components necessary for the operation as a bus (for example a number of voltage converters, resistors, and the like).

In particular on account of this configuration of the electronics board, a comparatively high degree of decentralization and thus a high degree of modularity for the respective control tasks occurring at the objective lens main body and the objective lens are achieved. Replacement of defective controllers and/or controllers that are to be reconditioned in the form of a respective plug-in card is thus possible with little outlay and in particular without adaptation measures that may be required on the entire electronics system.

In a further exemplary embodiment that is an alternative to the previous exemplary embodiment, the controller that is plugged into (and in particular retained in) the respective plug-in location of the electronics board is electrically connected, bypassing the electronics board, for example directly, to the (respective, in particular electrical) module. In this case, the electronics board for example forms a (in particular only one) interface for energy transfer to the controller, whereas the transmission of data, control signals or the like is effected directly between the controller and the respective module (for example using a direct cable connection). In this case, too, the above-described decentralization and modularity are made possible.

In an exemplary embodiment, the adjustable optical functional element or at least one of the possible plurality of adjustable optical functional elements is formed in each case by the above-described adjustable lens, the adjustable diaphragm, a filter (in particular an optical filter that is optionally insertable variably in the beam path) and/or an optical freeform element. An optical freeform element is here, and below, understood to mean in particular not only lenses having a freeform surface, but for example also a mirror or a combination of mirror and lens. Optionally, a plurality of adjustable functional elements are present that are formed by different elements of the abovementioned group. Typically, each adjustable functional element is also associated with an adjustment drive. The respective adjustment drive typically forms in each case a correspondingly associated lens drive, diaphragm drive (in particular for the adjustment of the aperture), filter drive and/or drive for the freeform element.

In an exemplary embodiment, the objective lens main body includes at least one second controller, which is likewise embodied in the form of a plug-in card. The electronics board includes at least two plug-in locations of the above-described type. The second controller or each further controller in this case is inserted into typically one of the (at least two) plug-in locations.

The first controller typically serves as a drive controller for the lens drive, and the second controller serves as a diaphragm controller for adjusting the diaphragm (that is to say in particular for controlling the diaphragm drive). If the adjustable lens is a focus lens, the drive controller is embodied in particular as a focus control device (or focus controller). In this exemplary embodiment, each of the above-described objective lens functions is thus typically realized by a separately associated controller. The objective lens main body and consequently the objective lens are able to be configured in a modular fashion with the corresponding function—that is to say with a lens or diaphragm adjustment by way of a motor. It is hereby in particular also made possible that, in the case of a malfunction only of the drive controller or of the diaphragm controller, only the respectively associated plug-in card needs to be changed.

In an exemplary embodiment, the objective lens main body includes an (in particular camera-specific) coupling apparatus (in short: "coupling") for mechanically connecting to the camera that carries the objective lens in accordance with the intended use. This coupling is expediently formed on the main frame. Optionally, a signal interface is associated with this coupling for communicating with the camera in a manner such that, when the mechanical connection to the camera is established, the signal interface is also brought into contact with an associated counterpart belonging to the camera. This signal interface serves in particular for exchange of information and for exchange of control commands (for example for adjusting a focus lens as part of an autofocus function, that is to say for focusing, and/or for adjusting the diaphragm). Said signal interface optionally also serves for receiving the supply energy for the corresponding adjustment drive, in particular the lens and diaphragm drives and for the one or the different controller (s).

In an exemplary embodiment, the first controller or one of the possible plurality of controllers is embodied as a communications controller and thus typically correspondingly also as a (possibly further, that is to say second or third, etc.) plug-in card of the above-described type and inserted into one of the plug-in locations. Said communications controller is configured to provide the communication with the camera that carries the objective lens in the operating state in accordance with the intended use, possibly additionally or alternatively to at least one peripheral device connected to the objective lens (said peripheral device representing or comprising one of the above-described external modules), which peripheral device, during operation, receives data from the objective lens or transmits data to the objective lens. Optionally, said communications controller is configured and provided for converting between a data protocol used within the objective lens and a camera-specific or peripheral-device-specific data protocol (that is used by the camera that is to be connected). In this case, the communications controller is consequently configured as a (camera-) specific communications interface. Optionally, the communications controller is one of the two above-described (first and second) controllers. The respectively other controller is then for example embodied as a diaphragm controller and/or drive controller. This communications controller, however, typically forms an additional controller and thus an additional plug-in card. The objective lens main body and/or the outer housing of the objective lens expediently includes a communications interface for signal transmission with the camera (for example the above-described signal interface that is associated with the coupling) and/or with at least one external peripheral device. On account of using the corresponding plug-in card, it is consequently possible for the objective lens main body and therefore the objective lens to be adapted easily—possibly with adaptation of the mechanical coupling and the possibly associated signal interface—to the use with different camera types or peripheral devices, optionally different manufacturers. It is thus in turn possible to adapt objective lenses with a large number of identical parts for use on camera systems by different manufacturers or having different peripheral devices. Advantageously, the controllers (plug-in cards) developed for controlling the other objective lens functions can remain unchanged, in particular due to the fact that merely one corresponding plug-in card needs to be inserted for communication with the corresponding camera system. Optionally, the communications controller is also set up to transmit metadata (for example focal length ranges and diaphragm setting ranges) of the objective lens to the connected camera and/or to the peripheral device.

In an exemplary embodiment, in particular in the case that at least two controllers are provided, one of the controllers is connected directly to the associated module (that is possibly to be controlled), for example the adjustment drive, in particular the lens drive or the diaphragm drive, while the other controller is connected by signal transmission technology via the electronics board to the correspondingly associated module thereof.

In one exemplary embodiment, one of the plug-in cards, for example the first controller (or one of the further controllers) forms (possibly in combination with the electronics board) a main controller of the objective lens main body or of the objective lens, said main controller also being referred to as a "master controller" or "central control unit". Said master controller is here in particular set up to cover a number of objective lens functions (for example referred to as basic functions). Such basic functions are for example handling of signals (for example data) that are exchanged between different modules of the objective lens or of a system that is formed therewith (for example with the camera and/or at least one further external peripheral device), providing, as described above, the communication with the camera and/or the peripheral device, and/or controlling the diaphragm drive, since the values of the diaphragm opening are frequently specified on the camera-side in dependence on the prevailing light conditions and/or the current shutter time. The first controller optionally also represents (additionally or alternatively) a type of bus control device. Alternatively, however, said bus control device function can already be integrated in the electronics board. Further controllers that are embodied in the form of plug-in cards and provide the objective lens functions that are advantageous for the operation that is as automated as possible of the system formed by the camera and objective lens are referred to here in particular as "sub-controllers". This may be for example the above-described focus controller or a plug-in card that serves for controlling a lens drive for adjusting a "zoom lens". The functions focusing and zoom are optionally implemented in a common controller.

In a further exemplary embodiment, the first controller or one of the possible plurality of controllers (that is to say optionally an additional controller) is embodied as an energy controller that is inserted into one of the plug-in locations in particular as a further (that is to say second, third or fourth, etc.) plug-in card. The energy controller is configured for the energy supply of at least the respective adjustment drive (in particular the lens drive and the diaphragm drive) and typically also of at least one of the possible plurality of electrical modules of the objective lens formed by the objective lens main body, that is to say for example of another controller, in particular also optionally provided further controllers (in particular formed by way of a plug-in card), and/or of the external module that is possibly coupled to the objective lens in the operating state in accordance with the intended use. In particular, the electronics board in this exemplary embodiment includes (at least) three plug-in locations of the above-described type. The energy controller is typically coupled to a corresponding interface by way of which, during operation in accordance with the intended use of the objective lens, a corresponding supply energy for the objective lens, more specifically for the functions thereof, is obtained from the camera connected to the objective lens or from another, external energy source (for example a battery pack that is separate from the camera, or the like). In the former case, the energy supply interface is expediently arranged at the objective lens main body and typically integrated into the above-described interface that is assigned to the coupling. In the latter case, the energy supply interface is arranged in particular on the outer housing of the objective lens. Optionally, both cases are combined with one another, which means that, depending on the exemplary embodiment of the camera, energy can be obtained from said camera or from the external energy source. The energy controller typically includes electronic components that serve for converting and/or stabilizing and for feeding the operational energy that is generated (in particular converted) from the supply energy received into the electronics board. In this case, it is also possible in a simple manner to adapt the objective lens to the different camera systems or externally provided energy by the use of a correspondingly adapted energy controller.

In a further exemplary embodiment, the first controller or one of the possible plurality of controllers (that is to say optionally an additional controller) is embodied as a display controller. Accordingly, the latter is thus likewise formed as a (possibly further, that is to say second, third or fourth, etc.) plug-in card and is inserted into one of the plug-in locations. The electronics board here thus includes for example at least four plug-in locations of the above-described type, but at least a number of plug-in locations that is sufficient for the number of plug-in cards used. The display controller is configured and provided to alternatively control, in the operating state of the objective lens in accordance with the intended use, a connected external display (representing a module of the above-described type) in particular for the display of data that typically contain information linked to lens and/or diaphragm positions. This information for example is the lens and/or diaphragm positions themselves, in particular a focal length and/or distance setting or diaphragm number resulting from said positions. The plug-in card forming the display controller optionally also includes terminal contacts by which, in the mounted state of the objective lens in accordance with the intended use, direct signal exchange with the display is achieved. Alternatively, such terminal contacts are arranged on the electronics board. Optionally, the display controller is configured not only to control the display for displaying the abovementioned information, but also to derive, in particular even calculate, the information to be displayed, for example the focal length and the diaphragm number, from the information relating to the current position of the respective lens or diaphragm (provided typically by the respective controller).

In the above case, the objective lens expediently includes the abovementioned display (in particular arranged on the outer housing) for displaying the above-described information. It has been recognized that such a display represents a function of the objective lens that is not required by every user (alternatively referred to as "customer"). Depending on the desired design variant of the objective lens, it is thus possible in a simple manner and with a large number of identical parts to provide the objective lens with such a display or without, in particular by installing an outer housing with or without a display on the objective lens main body and the above-described display controller being correspondingly inserted (or removed or not inserted) thereon into the electronics board.

Alternatively, the display is an external display, i.e., also separate from the outer housing, for example an independent screen, a computer screen, a tablet or smartphone screen or the like. The data transmission is achieved optionally in cable-bound fashion or possibly wirelessly via a wireless interface that is implemented at the display controller or possibly at the above-described communications controller.

On account of the modularity of the objective lens main body and consequently also of the objective lens and the configuration of the previously described controllers as plug-in cards, it is thus advantageously possible to configure the objective lens with a large number of identical parts in a simple manner, specifically by adding corresponding plug-in cards or controllers that are configured as such, and the range of functions of the objective lens to customer specifications or even application specifications (optionally by way of the customer).

In a further exemplary embodiment, the objective lens includes at least one hand wheel (also referred to as "adjustment ring" or "rotating ring") for mechanically inputting an electronic actuation command for the (axial) adjustment of the, or the respective, axially adjustable lens. Said hand wheel, or the respective hand wheel, is typically arranged outside on the outer housing.

For this case, the first controller or one of the possible plurality of controllers (that is to say optionally an additional controller) is embodied as a controller for the at least one hand wheel (referred to below as "rotary encoder controller" or "ring controller"). The rotary encoder controller is here typically embodied for detecting a rotation of the, or the respective, hand wheel and for converting ("transforming") the detected rotation into the corresponding electronic actuation command for the corresponding lens drive (at least for the associated drive controller). That is to say that the wheel controller serves for generating the actuation command as a reaction to the receiving of the input by the hand wheel. Typically, the rotary encoder controller is associated with a rotary position sensor, in particular an absolute encoder (for example a Hall sensor or a comparative, for example optical rotary encoder) that is optionally arranged on the plug-in card itself or is positioned thereon (in particular in the region of the hand wheel itself on the outer housing of the objective lens) in a manner in which it is connectable or connected to said plug-in card by signal transmission technology. Said rotary position sensor optionally has an incremental or continuous design.

In a further exemplary embodiment, the first controller or typically one of the possible plurality of controllers (that is to say optionally an additional controller) is configured as a remote-control controller set up for the cable-bound or optionally cable-free reception of remote-control signals (for example for the operation of the objective lens and the associated camera on a drone, a camera crane or the like without the option of manual or direct access to the objective lens). In this case, adaptation to a specific remote control (that is to say an operating device that is external to the objective lens and by which the control commands that are to be transmitted to the objective lens and optionally also to the camera are generated) can be effected advantageously by installing a correspondingly associated remote-control controller that is set up in particular for converting the data protocol of the remote control. The objective lens, in particular the outer housing thereof, in this case optionally includes a signal connection (typically a plug connection) for making contact with a signal receiver of the remote control. The remote-control controller is connected to said signal receiver by signal transmission technology in the mounted state of the objective lens in accordance with the intended use.

In one exemplary embodiment, the objective lens main body furthermore also includes an (optionally further) controller correspondingly formed by a plug-in card, set up to determine information relating to imaging properties (for example distance setting, distortion, vignetting, or the like) of the objective lens typically based on the current positions of the adjustable lens and/or the current diaphragm setting. To this end, the controller obtains the necessary information (lens positions and possibly diaphragm setting) typically from the respective other controller (for example the drive controller, diaphragm controller or the like). Furthermore, this plug-in card is in particular also configured to transmit said information (for example by the above-described communications controller and/or the camera interface) to the connected camera or to an external device, for example an image processing computer.

The objective lens main body (and consequently also the objective lens) thus typically includes a large number (for example at least six, in particular seven, eight or nine) of the above-described plug-in locations, by which the range of functions of the objective lens can be changed to customer specifications and/or also camera manufacturer specifications by virtue of controllers (control devices) being inserted that are in the form of a plug-in card and are associated with the respectively desired and necessary functions. In this way, advantageously an objective lens modular system is provided, in which with a large number of identical parts a large number of design variants, in particular with respect to different operating functions, can be realized in a simple manner.

In an exemplary embodiment, the respective plug-in location of the electronics board is configured both for making electrical contact and also for mechanically retaining the respective plug-in card. In this case, additional components that are separate (from the respective plug-in location and possibly the electronics board) for mechanical attachment of the respective plug-in card (for example clamps or the like arranged on the main frame) can be expediently dispensed with.

In one exemplary embodiment, the electronics board is embodied as a ring-shaped circuit board (in particular referred to as a "ring printed circuit board" or "backplane") that at least partially encompasses the main frame. The ring-shaped circuit board here optionally has the structure of a closed or open (in the shape of a semicircle or partial circle, optionally also polygonal) ring, typically in an approximately two-dimensional (that is to say in particular areal) extent. The ring optionally has a three-dimensional structure (for example in the form of an at least partial torus or a comparative ring-type polyhedron). The plug-in locations are arranged on the circuit board such that the respective plug-in card in the mounted state in accordance with the intended use is oriented so as to extend in the longitudinal direction (in particular in the direction of the optical axis) of the main frame. The plug-in locations are thus typically distributed in the circumferential direction around the main frame and are oriented substantially (that is to say exactly or approximately) tangentially on the electronics board. The respective plug-in card rests here optionally in the mounted state in accordance with the intended use on the main frame. In an optional exemplary embodiment, the electronics board is embodied as what is known as a rigid-flex printed circuit board. That is to say the electronics board has at least two comparably rigid circuit board portions that are mechanically and electrically connected to one another by a connecting piece that is more flexible compared to the former. In a further exemplary embodiment, the electronics board has a ribbon cable on which the respective plug-in locations are placed and that connects the respective plug-in locations by signal transmission and energy transfer technology. Alternatively, the above-described two-dimensional or three-dimensional structures can also deviate from a ring shape and form for example a circular segment, a circular sector, a (possibly concave) polygon, a polyhedron, or a torus.

The above-described controllers are, for example, embodied as non-programmable electronic circuits (for example what are known as ASICS) or by a microcontroller having a processor and a data memory and on which the corresponding functionality of the respective controller is implemented in terms of software.

As has already been described, the outer housing is typically embodied to be dependent on the range of functions of the objective lens. If the objective lens for example includes the above-described display, it is typically integrated in the outer housing and connected (indirectly via a corresponding interface of the electronics boards or directly) by signal transmission technology in the mounted state of the objective lens in accordance with the intended use with the above-described display controller that is inserted as a plug-in card into one of the plug-in locations of the electronics board. Similar also applies to the, or to the respective, above-described hand wheel for mechanically inputting an electrical actuation command.

In an exemplary embodiment, the objective lens main body includes a signal interface, arranged on the main frame, for transmitting (control) signals between the electronics board, in particular the respective controller, and the correspondingly associated functional unit that is arranged on the outer housing, such as for example the rotary position sensor associated with the respective hand wheel, the display or the like. Said signal interface is configured for reversibly coupling to a counter-interface of the outer housing (that is to say a counter-interface arranged on the outer housing). This advantageously prevents each plug-in card from having to be separately connected to the corresponding functionality positioned on the outer housing (for example a hand wheel, the display, etc.). Data transmission is thus effected here, too, in a centralized fashion via said signal interface and the electronics board that typically forms a bus.

The terms "reversible receiving" or "reversible coupling" are understood to mean that the attachment device or the signal interface of the objective lens main body are configured such that the connection to the outer housing or to the counter-interface of the outer housing can be created multiple times, and also be released again, particularly easily and expediently by a user of the objective lens—that is to say rather than by trained staff for example of the manufacturer. In other words, the attachment device or the signal interface are embodied for easy and repeat connection to the outer housing or the counter-interface thereof. In this way, the attachment device or the signal interface differentiates itself from connecting means that can be released in principle but that, without the relevant technical expertise, are at great risk of damage to signal lines, optical functional elements, and the like. To this end, the signal interface has for example spring contacts, blade contacts or the like, which make a connection to the counter-interface under the application of force possible in a simple manner.

Due to the fact that the main frame of the objective lens main body includes the attachment device for reversibly receiving the outer housing and the signal interface configured for reversibly coupling to the counter-interface, a particularly simple exchange of the outer housing is made possible. Furthermore, it is also made possible advantageously that different outer housings that in each case address or select different groups (numbers or combinations) of the functions provided by the controller can be optionally mounted on the inner housing. In this way, it is possible in particular for different application cases to put together a respectively "suitable" (overall) objective lens in a simple manner. Consequently, there is no more need for objective lenses that are configured to a specific application case at the factory and that have a housing that is fixedly assigned by the manufacturer—for example objective lenses which are particularly lightweight—and consequently require a comparatively high financial investment by the user who must cover several application cases in this case with in each case separate objective lenses.

In particular where the objective lens main body is configured for reversibly retaining and thus for optionally exchanging the outer housing, the main frame is typically formed as an inner housing that encloses the number of optical functional elements, in particular lenses. In particular, the main frame is configured here such that it seals off the, or the respective, lens in particular with respect to soiling, that is to say typically with respect to dust, and possibly also with respect to moisture (in particular air humidity). This reduces, in combination with the easy interchangeability of the outer housing, the risk that soiling, in particular dust, enters the beam path within the objective lens, that is to say within the inner housing and/or between the lenses. Consequently, no clean-room conditions or at least conditions with reduced dust occurrence need to be observed during installation and/or changing of the outer housing.

In an exemplary embodiment, the attachment device for the outer housing includes a holding mechanism that is configured and provided for installation of the respective outer housing without tools. For example, the attachment device here includes part of a bayonet lock—wherein the respective outer housing carries the corresponding counterpart—or a pawl (or arrester hook) mechanism, in which the outer housing is pushed onto the inner housing and clipped to (or "hooked into") the pawl or the arrester hook. The corresponding counterpart, that is to say the pawl or the arrester hook itself or a corresponding cutout or a projection in which or behind which the pawl or the arrester hook engages in accordance with the intended use, is here typically arranged on the outer housing. Alternatively, the holding mechanism is formed for example by a mounting thread which is located around the optical axis and arranged on the inner housing (of the main frame) with an associated mounting ring, that is to say a type of nut. For mounting purposes, the outer housing is pushed onto the inner housing (the main frame), typically up to an abutment, in this case and subsequently clamped against the abutment using the mounting ring that has been pushed onto the mounting thread ("tightened"). Such a tool-free holding mechanism furthermore benefits the simple mountability of the outer housing.

In an exemplary embodiment, the holding mechanism has—in particular in the case of a bayonet lock or the pawl (or: arrester hook) mechanism—a latch, button or the like, by which the bayonet lock or the pawl or the arrester hook can be unlocked for disassembly. Said latch or button is arranged on the inner housing or alternatively on the outer housing.

The outer housing of the objective lens—as described above—includes a (communications) interface for signal transmission, in particular for data exchange with the at least one external peripheral device.

The objective lens system according to an aspect of the disclosure includes the above described objective lens, and at least two controllers of the type described above that are plugged into the at least one plug-in location of the electronics board or are able to be plugged into the, or the respective, plug-in location. Specifically, two plug-in cards that are associated with different functions of the objective lens are present with which the objective lens can be variably designed. The objective lens system includes a plurality of the above-described plug-in cards, with the result that the range of functions of the objective lens can be configured in a modular fashion in the manner of a modular system.

In an exemplary embodiment, the objective lens system typically also includes at least two differently embodied outer housings, that is to say two outer housings having a different range of functions. These are, as described above, retainable reversibly on the objective lens main body, in particular the main frame. In this case, for example one of the outer housings has the above-described display and the above-described hand wheels. The other outer housing, on the other hand, is configured for example for the operation of the objective lens on a drone or on a camera crane and is typically embodied as a "bare" tube, that is to say without a display and without hand wheels, so as to save on weight. For the operation on the drone or on the camera crane, typically the above-described plug-in card serving for communication with a remote control (that is to say the remote-control controller) is inserted into the corresponding plug-in location next to said housing. Said plug-in card serves for transmitting the actuation commands to the corresponding drive controller or diaphragm controller.

The conjunction "and/or" here and below is understood to mean that the features that are linked by way of this conjunction can be embodied both together and as alternatives to one another.

BRIEF DESCRIPTION OF THE DRAWINGS

The disclosure will now be described with reference to the drawings wherein:

FIG. 4 shows a circuit diagram of the electronic plug-in cards in a schematic block diagram according to an exemplary embodiment of the disclosure, FIG. 5 schematically shows a perspective view of an electronics board of the objective lens main body with plug-in cards that have been plugged in.

DESCRIPTION OF EXEMPLARY EMBODIMENTS

Mutually corresponding parts are provided throughout with the same reference signs in all of the figures.

Figure 1:
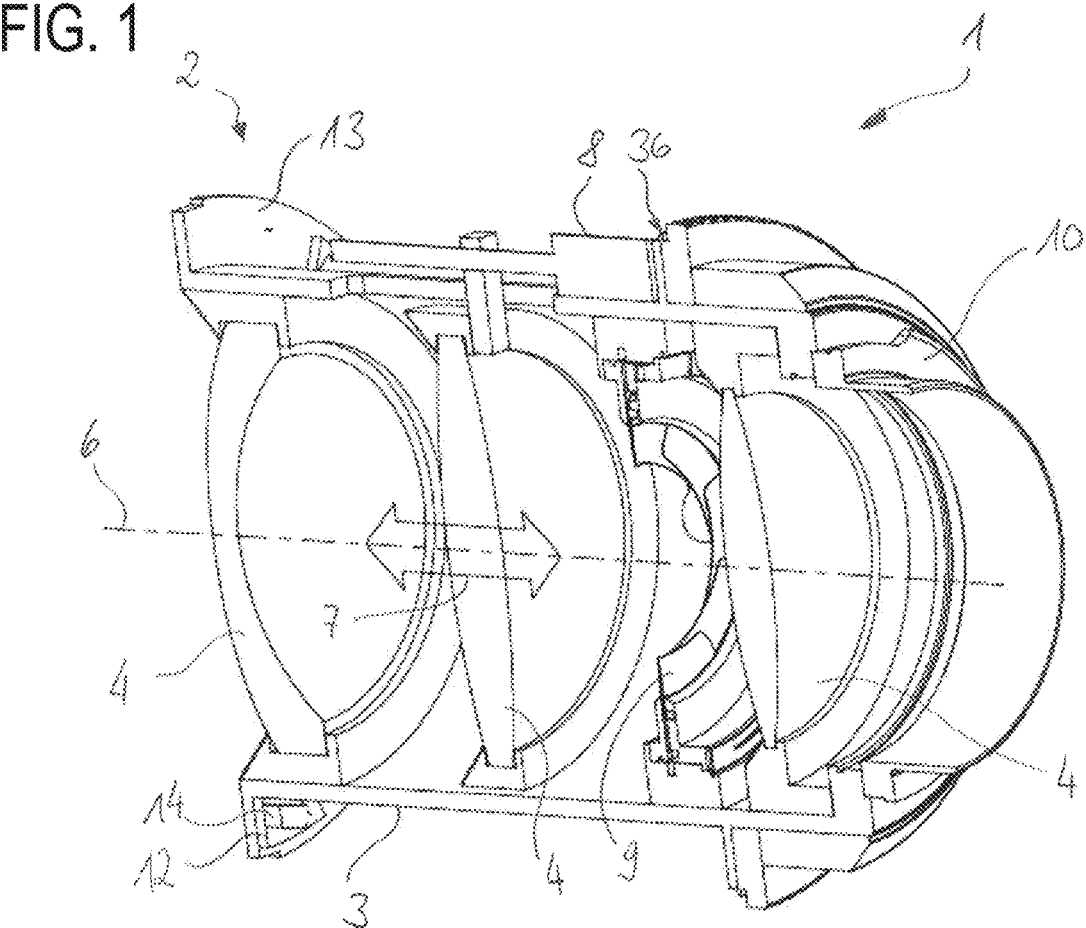
FIG. 1 schematically shows a perspective sectional view of an objective lens main body.
Figure 2:
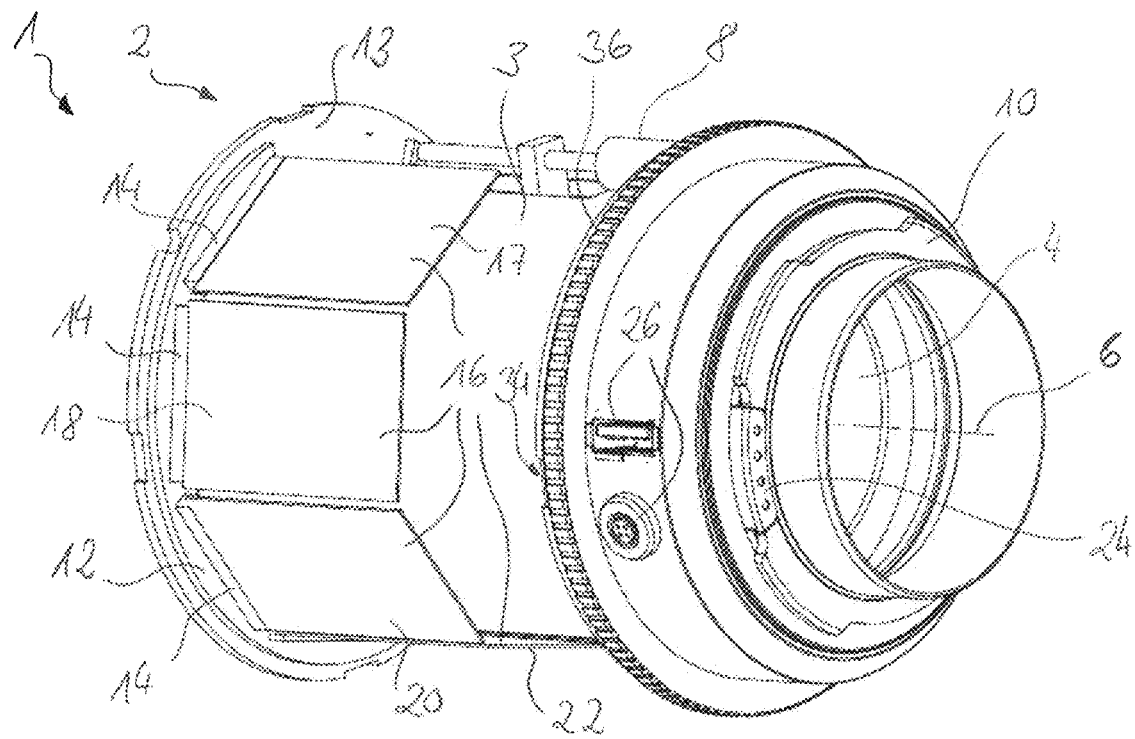
FIG. 2 shows a perspective view of the objective lens main body of FIG. 1 with a plurality of electronic plug-in cards.

FIGS. 1 and 2 schematically illustrate an objective lens 1 in a partially mounted state. The objective lens 1 serves for use on a camera. The objective lens 1 includes an objective lens main body 2. The latter has a main frame 3, carrying a plurality of lenses 4 (illustrated here by way of example are three) as optical functional elements. Some of the lenses 4 are retained movably along an optical axis 6 (see double-headed arrow 7) and is adjustable by way of an electric motor using a lens drive 8. Said adjustable lenses 4 thus represent adjustable optical functional elements. One of the adjustable lenses 4 specifically serves for focusing an object (item) that is captured by way of the objective lens 1 onto an image plane, for example onto a photosensitive sensor chip of the camera, and will be referred to below as a "focus lens". At least one further lens 4 is adjustable by a further lens drive (not illustrated in more detail) for changing the focal length of the objective lens 1 and will be referred to below as a "zoom lens". The objective lens main body 2 additionally includes, as a further adjustable optical functional element, a diaphragm 9 and for the adjustment of the diaphragm 9 by an electric motor an associated diaphragm drive (not illustrated). For reversibly coupling the objective lens main body 2 and thus the objective lens 1 to the camera, the objective lens main body 2 includes a coupling apparatus 10, configured in the manner of a bayonet lock.

Figure 6:
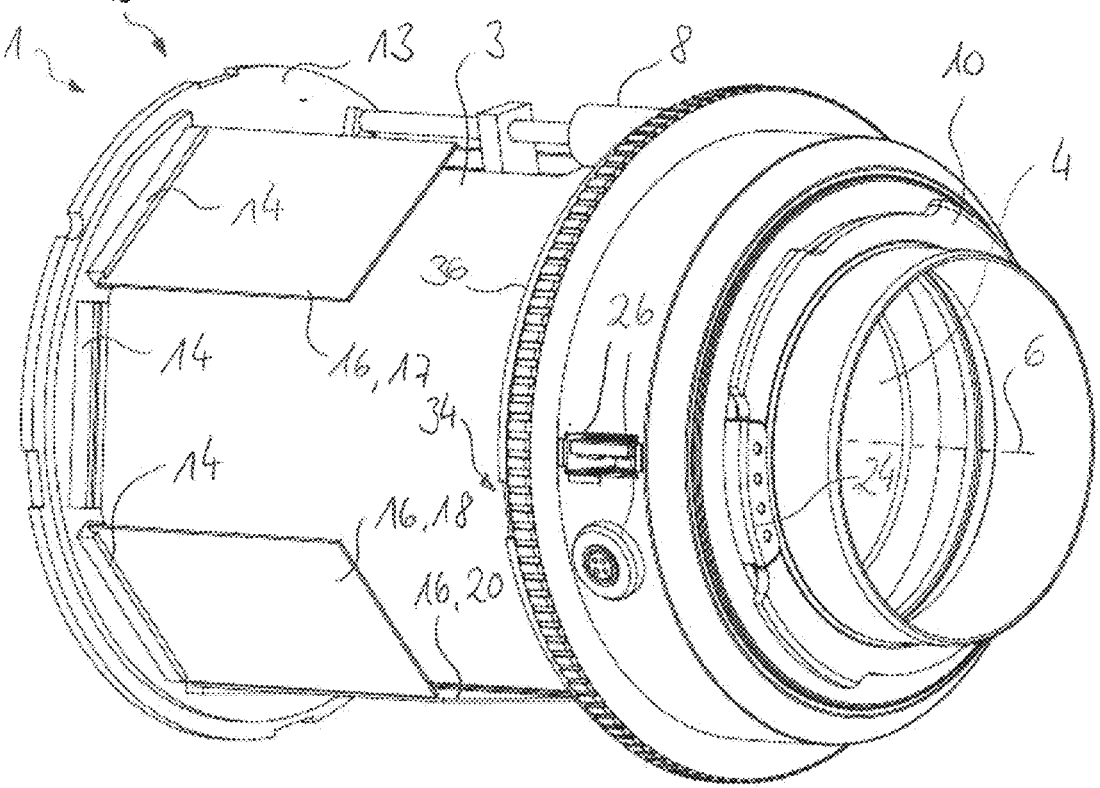
FIG. 6 shows a view in accordance with FIG. 2 of the objective lens main body according to an exemplary embodiment of the disclosure.

The objective lens 1 additionally includes an electronics board 12 (see FIG. 2) which in the illustrated exemplary embodiment takes the form of an annular-disc-type circuit board (or: "ring printed circuit board") and is positioned on and attached to a shoulder-type step 13 of the main frame 3. The electronics board 12 includes a number of plug-in locations 14 (specifically seven, see FIG. 6) for reversibly receiving in each case one plug-in card 16. Each of the plug-in cards 16 forms a controller that is configured and provided for making available and/or controlling a function of the objective lens 1. One of the plug-in cards 16 is embodied as a first controller, specifically as a drive controller 17, which is configured for controlling the lens drives 8 that are associated with the focus lens and the zoom lens. The drive controller 17 thus represents, inter alia, a focus control device and thus serves for controlling an (auto-) focus function of the objective lens 1. A further plug-in card 16 is embodied as a second controller, specifically as a diaphragm controller 18, which serves for controlling the diaphragm 9 and thus as a diaphragm control device (for controlling the opening function of the diaphragm 9). Yet a further one of the plug-in cards 16 is embodied as an energy controller 20. The energy controller 20 includes (in a manner which is not illustrated in more detail) electronics components for receiving energy (that is to say supply energy) from an energy source that is separate from the objective lens 1 (for example terminal contacts for a plug connection for cable-bound reception of energy or a coil for inductively receiving energy).

The objective lens 1 further includes a communications controller 22 that is likewise embodied as one of the plug-in cards 16. The communications controller 22 provides data exchange (that is to say communication) between the objective lens 1 and the camera that carries it in the operating state in accordance with the intended use. For coupling to the camera by signal transmission technology, the objective lens 1, specifically the objective lens main body 2, includes a communications interface 24 that is arranged in the region of the coupling apparatus 10. Said communications interface 24 also optionally serves for the energy transfer between the camera and the objective lens 1. Additionally, data interfaces 26 are also arranged on the objective lens main body 2, said data interfaces 26 being able to be used for effecting communication and/or energy transfer with external peripheral devices.

Figure 3:
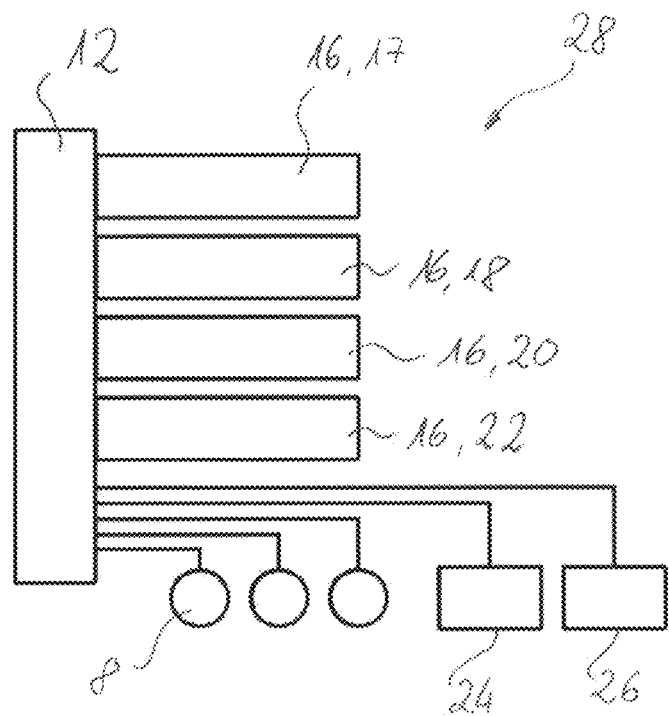
FIG. 3 shows a circuit diagram of the electronic plug-in cards in a schematic block diagram according to an exemplary embodiment of the disclosure.

In an exemplary embodiment which is illustrated in more detail in FIG. 3, the electronics board 12 forms a type of bus system for the centralized data exchange and energy transfer between the individual plug-in cards 16 and at least the lens drive 8 and the diaphragm drive. The electronics board 12, together with the plug-in locations 14 and the respectively plugged-in plug-in cards 16, thus forms an (objective lens) control electronics system 28 of the objective lens 1 that is constructed in modular fashion. The objective lens 1 is particularly amenable to maintenance processes on account of said modular control electronics system 28. This is because, if a malfunction for example of the drive controller 17 occurs, the entire control electronics system 28 no longer needs to be changed but only the corresponding plug-in card 16 (that is to say in this case the drive controller 17). In addition, the electronics board 12, specifically the respective plug-in location 14, is used to mechanically retain the respective plug-in card 16.

Figure 4:
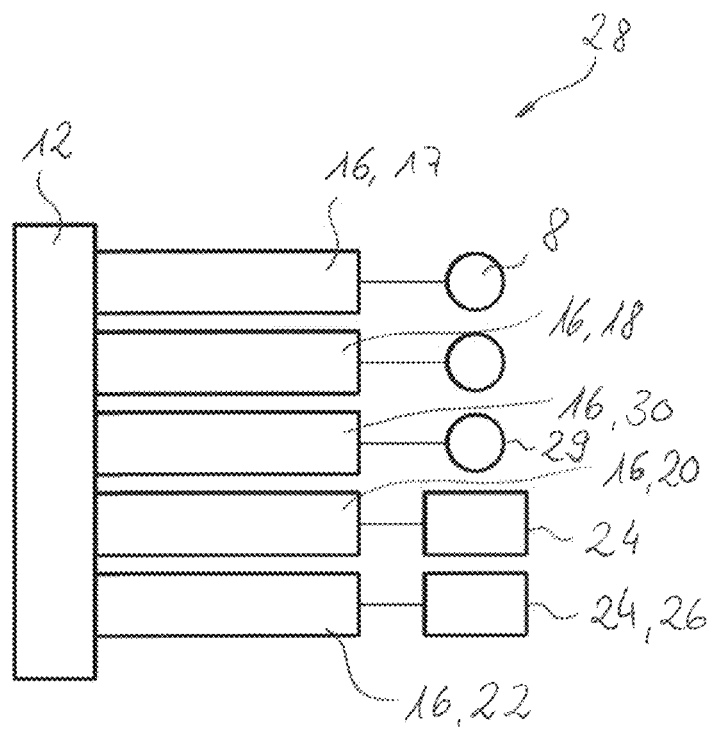

FIG. 4 illustrates an exemplary embodiment of the control electronics system 28 which has been modified with respect to FIG. 3. The individual controllers or plug-in cards 16 here are connected directly—that is to say for example by way of specific contact locations—to the functionalities that are to be addressed, that is to say for example the lens drive 8 or the communications interface 24. The electronics board 12 serves as a bus for the energy transfer to the individual plug-in cards 16 and for the data exchange which may be necessary among the plug-in cards 16. The energy controller 20 in the exemplary embodiment shown in FIG. 4 is also connected to the communications interface 24, in this case also configured for the energy transfer between the camera and the objective lens 1.

Figure 5:
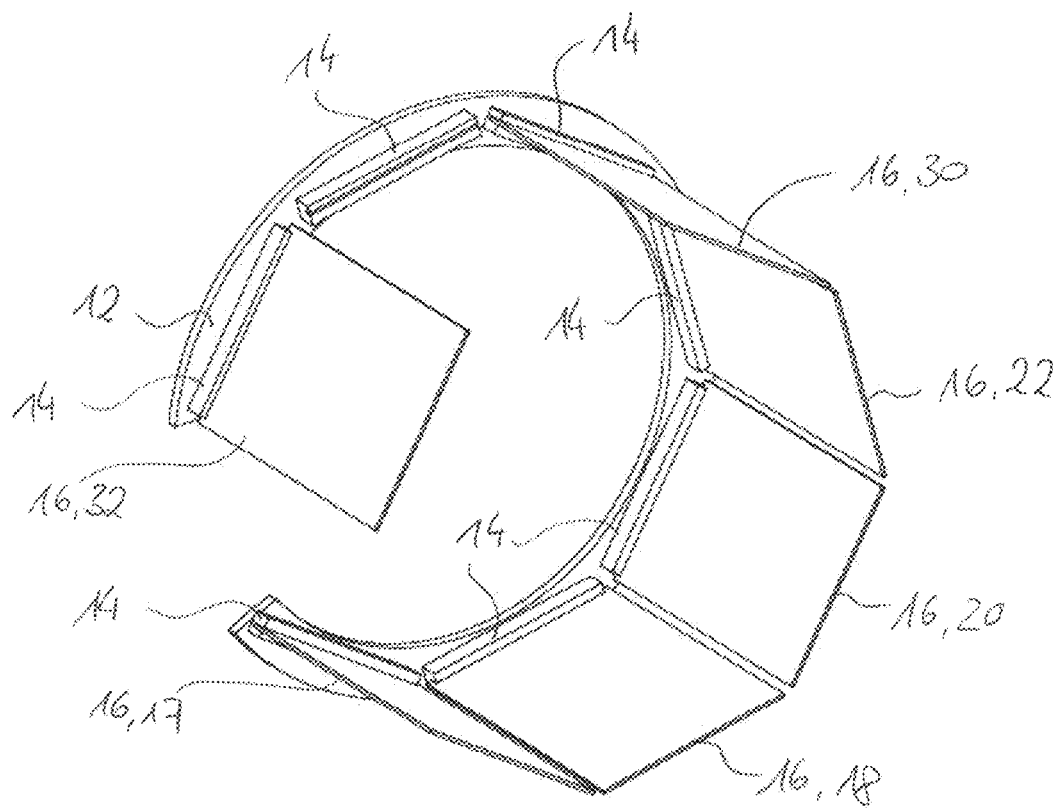

The objective lens 1 additionally also includes a function for image stabilization. Specifically, the objective lens 1 to this end includes a stabilization drive 29, configured to move at least one of the lenses 4 transversely to the optical axis. In addition, the objective lens 1 also includes an image stabilization controller 30 (see FIGS. 4 and 5), which in turn is embodied as one of the optionally pluggable plug-in cards 16 and is arranged in one of the plug-in locations 14. This image stabilization controller 30 is associated with an acceleration sensor (not illustrated in more detail) that is arranged on the main frame 3 and by which movements of the objective lens 1 transversely to the optical axis 6 can be captured. The stabilization drive 29 is controlled for the at least partial compensation of the transverse movements by a movement of the associated lens 4 by way of the image stabilization controller 30 in dependence on the captured (transverse) movements.

The objective lens 1 according to the exemplary embodiment shown in FIG. 1 and FIG. 2 is additionally also configured and provided to be operated, that is to say for example changed in terms of zoom and diaphragm settings, by way of remote control without manual access to the objective lens 1 itself. To this end, the objective lens 1 includes a remote-control controller 32 that is mounted in the form of one of the plug-in cards 16 on the electronics board 12. The remote-control controller 32 is configured for (for example wirelessly) receiving the remote-control signals from the remote control and for converting them into the data format that is used by the electronics board 12 as a bus system and consequently also processable by the drive controller 17 and the diaphragm controller 18.

The objective lens main body 2 illustrated in the exemplary embodiment shown in FIGS. 1 and 2 has a full range of functions—that is to say all plug-in locations 14 contain in each case one plug-in card 16. By contrast, in the exemplary embodiments shown in FIGS. 5 and 6, the objective lens main body 2 is illustrated in a modified design variant with a limited range of functions, because in each case one of the plug-in locations 14 is not occupied.

It has been recognized that the control electronics system 28 of the objective lens 1 is changeable in terms of its functions, specifically in terms of the range of functions thereof, by way of a user-specific selection of the plug-in cards 16 that are being used. Consequently, the objective lens 1 can also be configured in terms of the range of functions thereof to user-specific or customer-specific preferences or to a current use profile. For example, the remote-control controller 32 is not necessary if the objective lens 1 is to be operated only manually.

The objective lens main body 2, specifically the main frame 3 thereof, also includes an attachment apparatus (indicated by way of a cutout 34 in a supporting shoulder 36) by which an outer housing 38 (see FIGS. 7 to 10) can be reversibly attached interchangeably to the main frame 3 in a simple manner. The cutout 34 forms a part of a bayonet lock for the outer housing 38. Said outer housing 38 initially serves for protecting the control electronics system 28 and the main frame 3 against environmental conditions.

For example, the objective lens 1 is part of an objective (modular) system including a plurality of different ones of the above-described controllers, in the form of plug-in cards 16, and also a plurality of outer housings 38 that can be mounted to the main frame 3 or the electronics board 12 depending on the application requirement of the objective lens 1.

Figure 7:
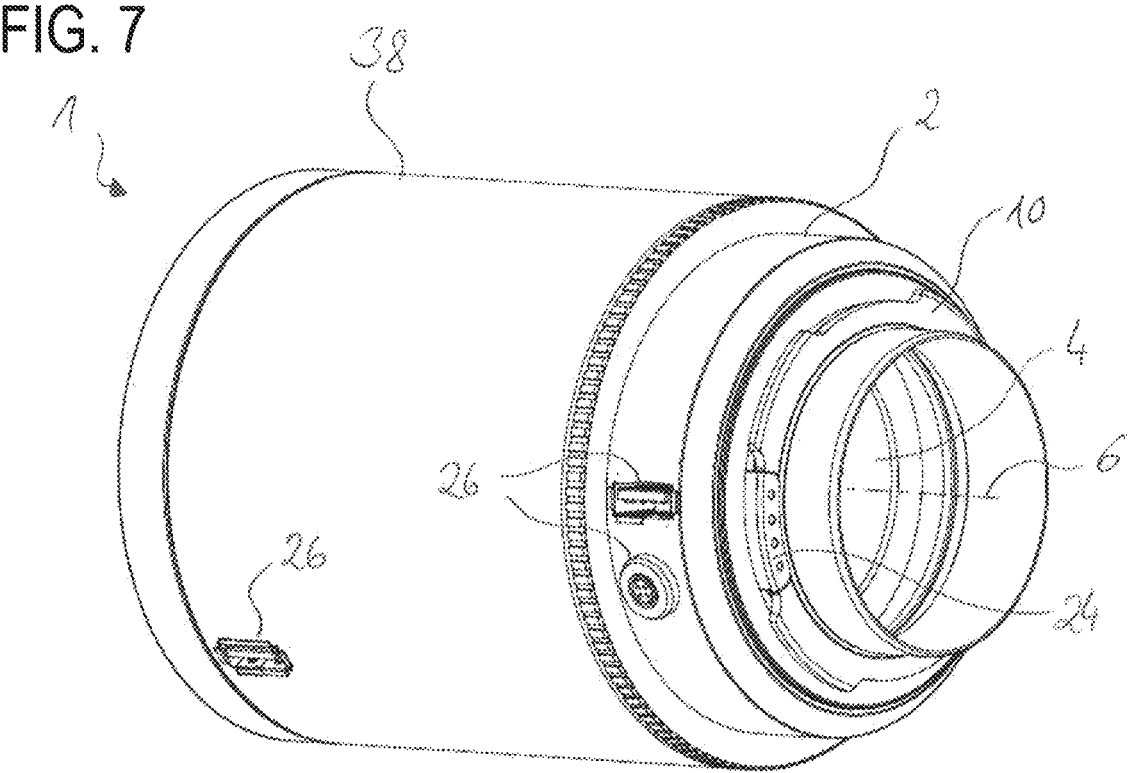
FIG. 7 shows a perspective view of an objective lens with the objective lens main body and an outer housing according to an exemplary embodiment of the disclosure.
Figure 8:
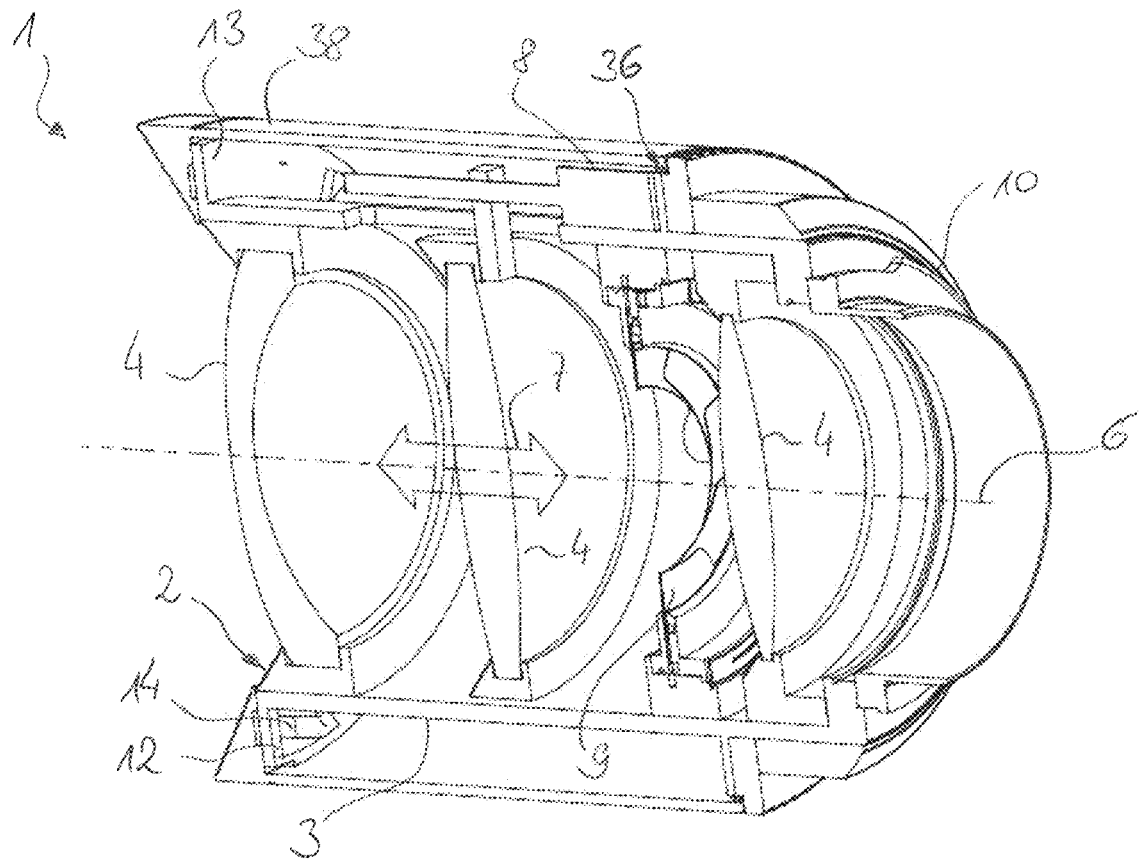
FIG. 8 shows a perspective sectional view of an objective lens with the objective lens main body and an outer housing according to the exemplary embodiment shown in FIG. 7.

In the exemplary embodiment shown in FIGS. 7 and 8, the outer housing 38 of the objective lens 1 has merely one additional data interface 26. No further additional attachments are located on the outer housing 38. Said outer housing 38 is configured for the remote-control operation of the objective lens 1 and of the camera, for example on a drone or a camera crane. In this case, the remote-control controller 32 is also inserted in the electronics board 12 (not illustrated in FIG. 8). Optionally, other controllers that are not necessary for the remote-control operation are removed. The remote-control signals are received optionally via radio signals or via the data interface 26 arranged on the outer housing 38.

Figure 9:
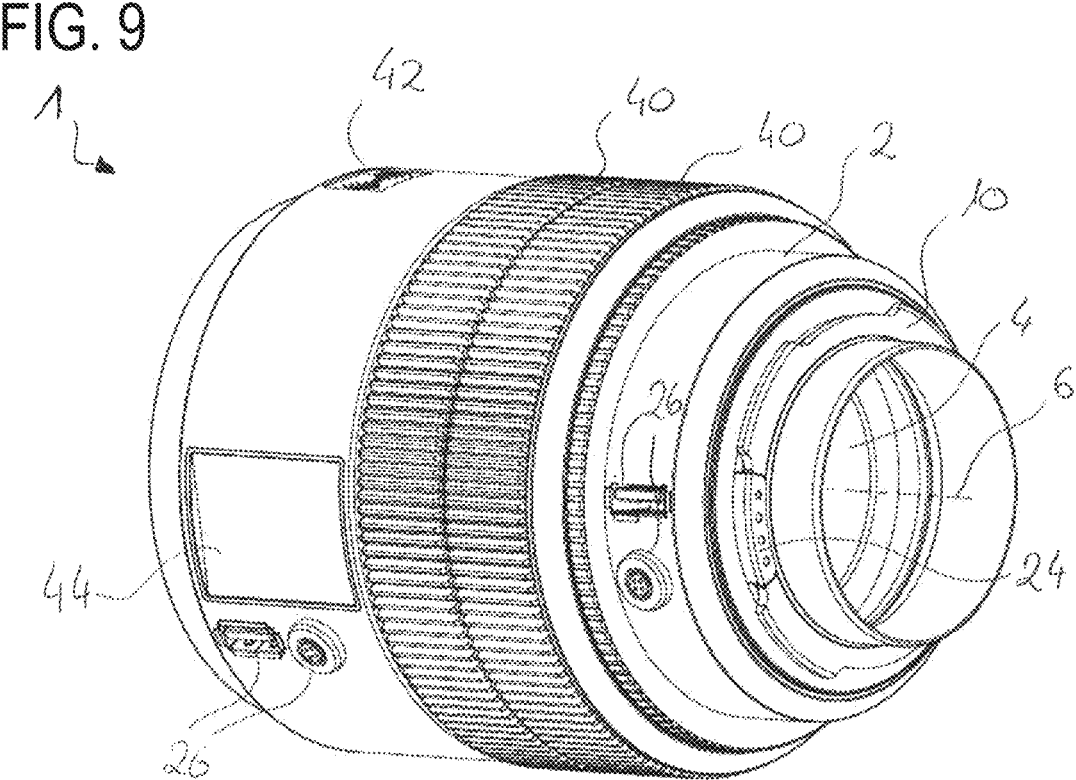
FIG. 9 shows a perspective view of an objective lens with the objective lens main body and an outer housing according to another exemplary embodiment of the disclosure.
Figure 10:
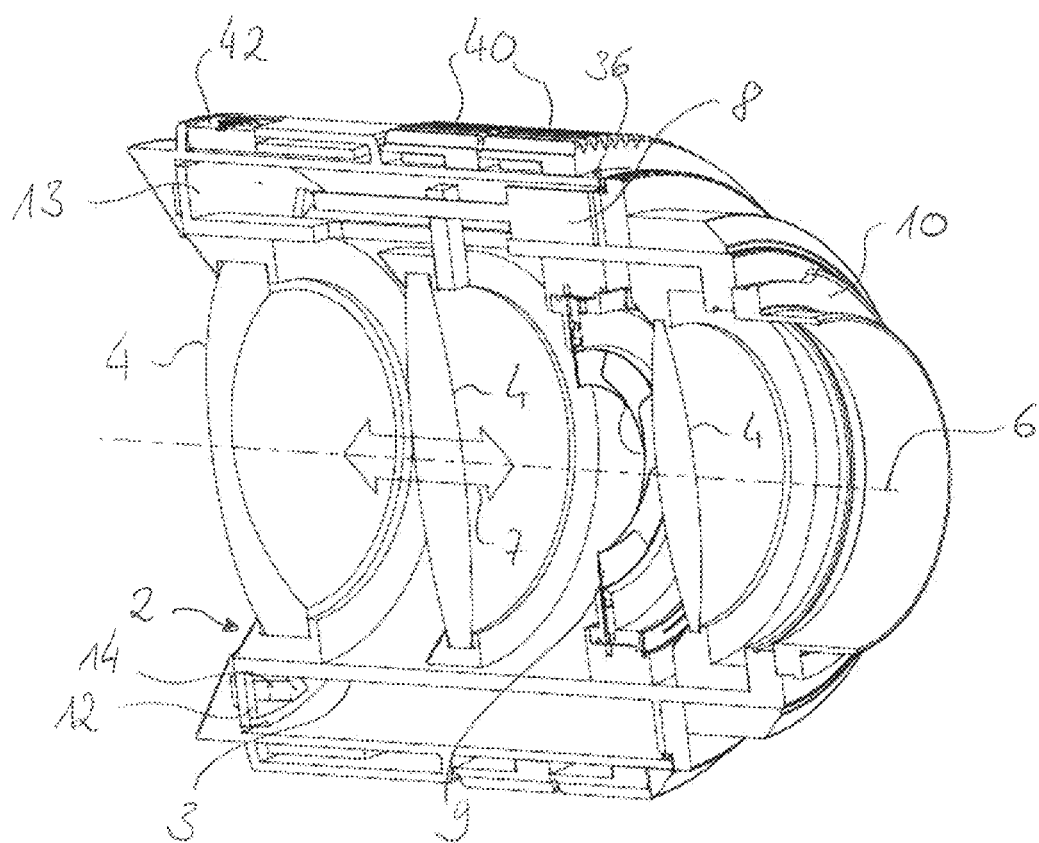
FIG. 10 shows a perspective sectional view of an objective lens with the objective lens main body and an outer housing according to the exemplary embodiment shown in FIG. 9.

In an alternative exemplary embodiment—which also represents an alternative design variant of the above-described objective lens system—in accordance with FIGS. 9 and 10, the objective lens 1 has in each case a hand wheel 40 (also referred to as rotating ring; arranged on one alternative exemplary embodiment of the outer housing 38) for the adjustment of the zoom lens and the focus lens. A rotation of the respective hand wheel 40 is read here electronically (by way of a rotary position sensor which is not illustrated in more detail) and an actuation command for the lens drive 8 is output therefrom via the controller 17. The objective lens 1 thus does not include any mechanical transmission of power between the respective hand wheel 40 and the respectively associated lens 4. For reading the rotation, the objective lens 1, by contrast, includes a wheel controller (also referred to as a "rotary encoder controller") that is likewise embodied in the form of one of the plug-in cards 16 and is inserted in a corresponding plug-in location 14 (for example in the respectively free plug-in location 14 in FIGS. 5 and 6). The rotary encoder controller receives from the rotary position sensor a signal that is characteristic of the rotation of the respective hand wheel 40 and passes it on to the drive controller 17 as an actuation command.

The outer housing 38 also includes in the exemplary embodiment shown in FIGS. 9 and 10 a radio antenna 42, by which the remote-control controller 32 can receive the corresponding control signals.

The objective lens 1 further includes a display controller (not illustrated in more detail) formed by one of the plug-in cards 16. Said display controller is configured to control a display 44 that is arranged on the outer housing 38 for displaying objective lens information.

The subject matter of the disclosure is not restricted to the exemplary embodiments described above. Rather, further exemplary embodiments of the disclosure can be derived by a person skilled in the art from the above description. In particular, the individual features of the disclosure described with reference to the various exemplary embodiments and the design variants thereof can also be combined with one another in another way.

LIST OF REFERENCE NUMERALS

1 Objective lens
2 Objective lens main body
3 Main frame
4 Lens
6 Optical axis
7 Double-headed arrow
8 Lens drive
9 Diaphragm
10 Coupling apparatus
12 Electronics board
13 Step
14 Plug-in location
16 Plug-in card
17 Drive controller
18 Diaphragm controller
20 Energy controller
22 Communications controller
24 Communications interface
26 Data interface
28 Control electronics system 29 Stabilization drive
30 Image stabilization controller
32 Remote-control controller
34 Cutout
36 Supporting shoulder
38 Outer housing
40 Hand wheel
42 Radio antenna
44 Display

What is claimed is:

1. An objective lens main body for an objective lens, the objective lens body comprising:
a main frame configured to retain optical functional elements;
at least one adjustable functional element retained adjustably on the main frame;
at least one adjustment drive, arranged on the main frame, configured to adjust the at least one adjustable functional element;
an electronics board attached indirectly or directly to the main frame and including at least one plug-in location configured to reversibly receiving a plug-in card;
at least one controller configured as the plug-in card, inserted into the at least one plug-in location, and configured to exchange signals with an electrical module of the objective lens or of an external unit.

2. The objective lens main body according to claim 1, wherein the first controller is configured to control the at least one adjustment drive.

3. The objective lens main body according to claim 1, wherein the electronics board provides an electrical connection between the controller and the electrical module.

4. The objective lens main body according to claim 1, wherein the controller is bypassing the electronics board and electrically connected to the associated module.

5. The objective lens main body according to claim 1, wherein:
the at least one adjustable functional element is a lens, a diaphragm, a filter, and/or an optical freeform element, and
a respective adjustment drive forms a lens drive, a diaphragm drive, a filter drive, and/or a drive for the freeform element.

6. The objective lens main body according to claim 1, wherein:
the at least one controller is a first controller,
the plug-in card is a first plug-in card,
the objective lens main body further comprises:
at least two plug-in locations, and
a second controller is a second plug-in card.

7. The objective lens main body according to claim 1, wherein the controller or a further controller is a communications controller configured to provide communication with a camera that carries the objective lens in an operating state according to an intended use and/or with a peripheral device connected to the objective lens in the operating state according to the intended use.

8. The objective lens main body according to claim 1, wherein the controller or a further controller is an energy controller configured to supply energy to electrical modules of the objective lens, and/or to an external module coupled to the objective lens in an operating state according to an intended use.

9. The objective lens main body according to claim 1, wherein the controller or a further controller is as a display controller configured to control at least one display.

10. The objective lens main body according to claim 1, wherein the plug-in location is configured to mechanically retain and make electrical contact with the plug-in card.

11. The objective lens main body according to claim 6, wherein:
the electronics board is a ring-shaped or polygonal circuit board that partially encompasses the main frame, and
the plug-in locations are arranged such that a respective plug-in card is oriented so as to extend in the longitudinal direction of the main frame.

12. The objective lens main body according to claim 1, wherein the main frame is an internal housing that surrounds a number of lenses.

13. The objective lens including the objective lens main body according to claim 1, comprising:
an outer housing enclosing the objective lens main body, and
wherein the main frame of the objective lens main body includes a device to attach the main frame to the outer housing.

14. The objective lens according to claim 13, further comprising a display arranged on the outer housing.

15. The objective lens according to claim 13, further comprising:
at least one hand wheel arranged on the outer housing for mechanically inputting an electronic actuation command for the at least one adjustment drive.

16. The objective lens according to claim 13, further comprising at least one interface, arranged on the outer housing, for exchanging data with the at least one external peripheral device.

17. An objective lens system comprising:
an objective lens according to claim 13, and
at least two controllers configured to be plugged into the at least one plug-in location of the electronics board.

18. The objective lens system according to claim 17, wherein the objective lens comprises at least two differently embodied outer housings which are reversibly retainable on the objective lens main body.

* * * * *